3,772,292
N-HYDROXYMETHYL COMPOUNDS, COMPOSITIONS CONTAINING SUCH COMPOUNDS AND CELLULOSE-CONTAINING TEXTILE MATERIALS TREATED THEREWITH
James C. Martin, Johnson City, and Ronald H. Meen, Kingsport, Tenn., and Howard M. Lewis, Dallas, Tex., assignors to Eastman Kodak Company, Rochester, N.Y.
No Drawing. Filed Dec. 30, 1970, Ser. No. 102,982
Int. Cl. C07d 51/46
U.S. Cl. 260—256.4 F       1 Claim

ABSTRACT OF THE DISCLOSURE

Compounds having the formula

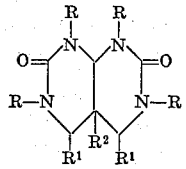

wherein each R is hydrogen, alkyl or hydroxymethyl, at least two R groups being hydroxymethyl, $R^1$ is alkyl, and $R^2$ is hydrogen or alkyl; compositions containing the described compounds and/or N-hydroxymethyl derivatives of other compounds obtained, in addition to the described compounds, by condensing an aliphatic aldehyde with a urea compound; and cellulose-containing textile materials treated with the compounds or compositions. The compounds and compositions impart wrinkle-resistant properties to cellulose-containing cellulose textile materials, such treated materials exhibiting excellent tensile strength and resistance to abrasion.

---

This invention concerns certain novel compounds and compositions and certain amino resins derived therefrom which impart wrinkle-resistant properties to cellulosic materials and a method for producing wrinkle-resistant cellulosic materials.

The use of urea-formaldehyde condensates as textile finishes is well known as is the method by which they are applied to cellulosic textile materials. Several amine-formaldehyde condensates, such as N,N'-dimethylolethyleneurea, have been used extensively to render cellulosic textile materials resistant to wrinkling. Such condensates and the methods by which they are applied to cellulose materials are described in U.S. Pats. 2,777,857; 2,876,062; 2,884,301; 3,041,199; 3,116,967; 3,158,501; 3,216,777; 3,324,062; 3,378,397; and 3,442,905, in Textile Industries, vol. 123, pp. 116 to 127 (October 1959), and in Marsh, Crease Resisting Fabrics, Reinhold Publishing Corporation, New York (1962). Such known condensation compounds, referred to as textile treating resins and as aminoplasts, suffer from a number of disadvantages such as high cost and severely decreasing the tensile strength and abrasion resistance of cellulosic materials treated therewith. It is desirable that textile treating resins impart crease-resistance and dimensional stability to cellulosic materials without adversely affecting the hand or physical properties of the material. It is also important that such textile treating resins can be synthesized from inexpensive materials so that the cost of resin-treated cellulosic materials is not increased substantially. The resins must also be capable of use in standard textile treating machinery and procedures and they must be sufficiently stable so that they can be stored and handled over extended periods of time and under various conditions.

We have discovered that the novel compounds and compositions of the invention impart wrinkle-resistant properties to cellulosic material without severely decreasing the tensile strength and abrasion resistance of the material.

Our novel compounds have the general formula (I) 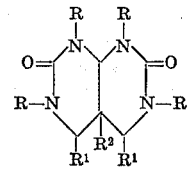

wherein each R is hydrogen, alkyl or hydroxymethyl, at least two R groups being hydroxymethyl, each $R^1$ is lower alkyl, and $R^2$ is hydrogen, methyl, ethyl or propyl. Our novel compositions are mixtures of a compound of Formula I with other compounds obtained as co-products in the synthesis of the compounds of Formula I and also mixtures of compounds obtained when the ratio of reactants used in the synthesis of compounds of Formula I is varied. Our novel compounds and compositions can be used in conjunction with known textile treating resins or the co-products obtained during the preparation of compounds (I) can be separated and employed in admixture with certain known textile treating resins to improve the properties of the latter. The novel compounds and compositions of our invention are prepared according to the equations:

Step 1:
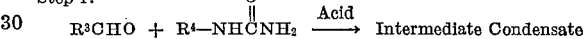

Step 2:
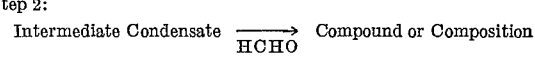

wherein $R^3$ is lower alkyl such as methyl, ethyl, propyl, isobutyl, and butyl and $R^4$ is hydrogen or lower alkyl. The group represented by $R^3$ determines the identity of $R^1$ and $R^2$ in Formula I. For example, when $R^3$ is methyl, each $R^1$ is methyl and $R^2$ is hydrogen; when $R^3$ is ethyl, each $R^1$ is ethyl and $R^2$ is methyl; and when $R^3$ is butyl, each $R^1$ is butyl and $R^2$ is propyl. When $R^4$ is hydrogen, the intermediate condensate obtained from Step 1 may contain an unmethylolated dione, i.e. hexahydro-4,5-dialkyl (or 4,4a,5 - trialkyl) pyrimido[4,5-d] - pyrimidine-2,7(1H,3H)dione corresponding to Formula I wherein each R is hydrogen. When $R^4$ is alkyl, two of the R groups of the unmethylolated dione are alkyl. The position of such alkyl groups on Formula I has not been determined but it is apparent that the positions of N-alkyl substitution may be 1,6; 1,8; 3,6; or 3,8 or a combination of those isomers.

Examples of the aldehydes which can be employed in Step 1 include acetaldehyde, propionaldehyde, butyraldehyde, and valeraldehyde. Urea, methylurea, ethylurea and propylurea are typical urea compounds which can be used in the synthesis of our novel compounds. For economic reasons, we prefer to use urea in the preparation of our novel compounds and compositions. Acetaldehyde is the preferred aldehyde because of its favorable cost and the excellent properties of the compound and compositions obtained from the acetaldehyde-urea compound condensate. The aldehyde may be added to a solution of urea and catalyst or the aldehyde and a solution of urea may be added to the catalyst. Usually, Step 1 is carried out in the presence of a solvent for the urea compound. Examples of suitable solvents include water, the lower alkanols such as methanol, ethanol, propanol, isopropanol, etc., or mixtures thereof. The weight ratio of reactants to solvent can be varied from 2:1 to 1:10, the amount of solvent not being important. Generally, we prefer to use a minimum amount of solvent which will enable the reaction mixture to be stirred in conventional production equipment and will permit the mixture to be conveniently handled. The acid catalyst employed in Step 1 is not important provided that the acidity of the reaction mixture is maintained at a pH 4 or below, preferably in the range of pH 0.5 to pH 2. Examples of acids which are capable of maintaining the reaction mixture at such a pH are sulfuric, phosphoric, hydrochloric, p-toluenesulfonic, methanesulfonic, and strongly acidic ion-exchange resins such as Dowex 50, a sulfonated polystyrene. Generally, any acid material having an acidity or ionization constant of at least $10^{-2}$ can be employed in the Step 1 reaction. However, the particular acid and the amount thereof which can be employed to maintain a pH of 4 or less will be apparent to those skilled in the art. The mole ratio of urea to aldehyde can be varied substantially but preferably is between 1:1 to 1:2, the ratio of about 2:3 being especially preferred. The reaction temperature for Step 1 can be varied between 0° to about 150° C. with temperatures in the range of 30° to 80° C. being preferred. The reaction time can be varied depending on other reaction conditions such as temperature and acidity. If desired, Step 1 can be carried out at pressures moderately above or below atmospheric pressures although atmospheric pressure gives satisfactory results.

The unmethylolated dione also can be prepared by condensing an aldehyde of the formula $R^3CHO$ with a pyrimidinylurea compound of the formula (II)

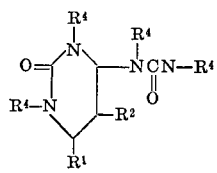

wherein $R^1$ and $R^2$ are defined above and each $R^4$ is hydrogen or alkyl, at least one of the $R^4$ groups attached to the pyrimidone ring and one of the $R^4$ groups of the urea residue being hydrogen. The aldehyde should be added to the pyrimidinylurea compound and acid catalyst using the conditions described above for Step 1. The mole ratio of the pyrimidinyl compound to the aldehyde should be about 10:1 to about 4:5, the theoretical ratio of about 1:1 being preferred. This technique can be used to prepare unmethylolated dione compounds where the $R^1$ group of Formula I are different. The pyrimidinylurea reactant can be substantially pure or it can contain significant amounts of the compounds formed when the pyrimidinyl compounds is prepared by condenting a urea compound and an aldehyde similar to the procedure of Step 1.

The components of the intermediate condensate obtained from Step 1 are dependent upon the mole ratio of the urea compound to aldehyde. For example, when equimolar portions of urea or alkylurea and an aldehyde having the formula $R^3CHO$ are reacted, the intermediate condensate contains from about 30 to about 40% each of a pyrimidinylurea compound of Formula II and unmethylolated dione and about 20 to 40% of unidentifiable compounds. As the ratio of urea or alkylurea to aldehyde is decreased from 1:1 to 1:2, the ratio of the pyrimidinylurea compound to the unmethylolated dione is believed also to decrease. For example, when 2 moles of urea are reacted with 3 moles of acetaldehyde, we believe that the resulting condensate contains about 40 to 60% of the unmethylolated dione, about 20 to 30% of the pyrimidinylurea compound and about 20 to 30% of compounds, the structures of which cannot be established. When the intermediate condensate contains significant amounts of dione, the dione can be separated from the intermediate condensate and methylolated according to Step 2 to obtain substantially pure compound of Formula I. The mixture of compounds constituting the intermediate condensate also can be methylolated to obtain a composition having unexpectedly improved properties as a textile treating resin. The co-products formed with the dione in Step 1 can be separated, methylolated and combined with certain known textile treating resins to provide resins exhibiting improved properties.

Step 2 can be carried out in the presence of acid or base. When conducted in a basic medium the pH of the reaction mixture should be at least 8 and preferably in the range of 9 to 12.5. Examples of catalysts capable of maintaining such a pH include the alkali metal hydroxides, carbonates and bicarbonates such as sodium hydroxide, potassium hydroxide, lithium hydroxide, sodium carbonate, sodium bicarbonate and potassium carbonate, the alkaline earth hydroxides such as barium and calcium hydroxide, quaternary ammonium hydroxides such as benzyltrimethylammonium hydroxide and basic ion-exchange resins such as Amberlite IRA-400 (a strongly basic ammonium hydroxide ion-exchange resin). The various basic materials and the amounts thereof which are useful in Step 2 can be determined by those skilled in the art. When using a basic catalyst we have found that the pH of the methylolation reaction mixture decreases significantly as the reaction proceeds to completion. For example, an initial methylolation pH of 12.5 will decrease to 10.3 during Step 2. When Step 2 is conducted under acidic conditions, the pH should be about 0.5 to 5 and preferably about 0.5 to 3. The acids used in Step 1 also can be used in Step 2 or more conveniently the pH of the reaction mixture containing the intermediate condensate from Step 1 can be adjusted either with base or acid prior to the addition of the formaldehyde. The amount of formaldehyde employed in Step 2 can be varied considerably, the optimum amount depending on the ratio of the reactants used in Step 1 and whether the dione or the crude condensate is being methylolated. When the unpurified intermediate condensate is used, the amount of formaldehyde that is used in Step 2 should be at least 1 mole, preferably about 1.5 moles to about 2.5 moles, per mole of urea used in Step 1. If the dione compound obtained from Step 1 is separated from the intermediate condensate mixture, at least 2 moles, preferably about 3 moles to about 4.5 moles, of formaldehyde per mole of dione are employed. The compounds of the intermediate condensate, which remain after the removal of the dione, can be methylolated using at least 1, preferably 1.5 to 2.75 mole(s) of formaldehyde per mole of urea used in Step 1. The intermediate condensate obtained in Step 1 when the mole ratio of the reactants is 1:1 is methylolated with about 1.5 to about 3 moles of formaldehyde per mole of urea used. The amounts of formaldehyde to be used as described in this paragraph are for unpurified intermediate condensates and dione compounds prepared from urea. The intermediate condensate and dione compounds obtained from alkylurea generally require about 50 to 60% of the above-mentioned amounts of formaldehyde. The use of excess formaldehyde in the methylolation of the intermediate condensate, including the dione, pyrimidinylurea and/or other co-products, generally is not detrimental.

Although the amount of formaldehyde employed determines primarily the number of hydroxymethyl groups present on the dione, the pyrimidinylurea compound and, possibly the other co-products, it is possible that some of the formaldehyde is in equilibrium with the corresponding N-hydroxymethyl derivatives. Thus, a reaction solution prepared using 4.5 moles of formaldehyde per mole of dione derived from urea and an aldehyde is believed to contain a mixture of the di-, tri- and tetra-(hydroxymethyl) compounds. Of the compounds of Formula I, those in which each R group is hydroxymethyl are especially preferred. However, because of the mentioned equilibrium and/or incomplete methylolation, the preferred compounds of Formula I contain as an average, about 3 to about 3.5 hydroxymethyl groups. The formaldehyde employed in Step 2 can be in the form of an aqueous solution or it can be derived from formaldehyde-yielding compounds such as paraformaldehyde. The reaction time for Step 2 will vary from a few minutes to several hours depending upon reaction conditions such as temperature, etc. The solvents which are used in Step 1 can be used in Step 2 in the event that any or all of the compounds constituting the intermediate condensate are isolated. Such a solvent can be supplied from Step 1, if the intermediate condensate compounds are not isolated prior to Step 2, or can be derived from the formaldehyde solution used. The reaction can be performed at about —20 to about 100° C., preferably between 25 and 75° C.

Our novel compositions obtained by the methylolation of an intermediate condensate prepared from a urea compound and an aldehyde reacted in a mole ratio of urea compound to aldehyde of 2 to 3 or more contain about 40 to 60% of a compound of Formula I and abut 40 to 60% of methylolated compounds which have not been conclusively identified. However, we believe that about 20 to 30% of such a composition is an N-polymethylol pyrimidinylurea compound of the formula (III)
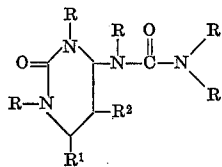

wherein R, R$^1$ and R$^2$ are defined hereinabove. The remaining 20 to 30% of the composition consists of one or more other methylol derivations of the unidentified compounds formed during Step 1. The novel compositions obtained by methylolating an intermediate condensate, prepared from a urea compound and an aldehyde reacted according to Step 1 in a urea compound:aldehyde ratio of about 1:1, contain (I), (III) and co-products. Although the number and positions of the methylol groups of the compound of Formula III has not been established, we believe that the N-polymethylolpyrimidinylurea component of our novel compositions is a mixture of compounds which contains two, three, or possibly more, methylol groups.

The novel compounds and compositions described hereinabove exhibit excellent properties when applied to cellulose materials, including regenerated cellulose (rayon) according to known procedures. These desirable properties include high wrinkle-resistance, good color (whiteness), resistance to acid and basic hydrolysis, good washed appearance, no significant effect on dye shade when used on colored cellulose materials, and rapid cure. The relatively low cost of the novel compounds and compositions is an especially advantageous feature. The novel compositions do not decrease the tensile strength and abrasion resistance of cellulosic materials to the extent which known durable press compounds do. The novel compositions, which consist essentially of (1) one or more compounds of Formula I and (2) the methylolated co-products formed during the aldehyde-urea condensation described above, are particularly advantageous. The compositions are economical since expensive isolation and purification procedures are not required during their synthesis. The abrasion resistance of cellulose materials treated with the novel compositions not only is superior to that of cellulose materials treated with known durable press resins, but, surprisingly, is superior to that of cellulose materials treated with a substantially pure compound of Formula I.

Cellulose-containing textile materials rendered resistant to wrinkling by treatment thereof with at least one of our novel compounds or compositions constitutes another aspect of our invention. The novel durable press compounds and compositions are applied to cellulose-containing textile materials according to conventional procedures in order to produce a high degree of wrinkle resistance thereto. The cellulose materials which can be rendered wrinkle resistant by our novel compounds and compositions include fibers, yarns, filaments, formed fabric, whether woven or non-woven, felted or otherwise formed, containing cellulose fiber prepared from cotton, rayon, linen, flax and other cellulose materials. The cellulose textile materials can be employed in combination with other non-cellulose materials such as, for example, blends of cellulose textile materials with other natural or synthetic fibers such as wool, nylon, acrylic, modacrylic and polyester fibers. The novel compounds and compositions also can be used on any fiber, fabric or other material which conatin hydroxyl groups, possibly built in, which are capable of undergoing reaction with the methylol groups of our compounds and compositions.

The compounds and compositions of our invention are applied to cellulose materials, preferably a formed, cellulose textile material, with a suitable curing catalyst from an aqueous solution. The solution of our compounds and compositions and the curing catalyst can be applied to cellulose materials by immersion, padding, spraying and the like, followed when necessary, by squeezing, hydro-extraction or similar processes in order to deposit the desired amount of resin solids onto the fabric. Any application technique can be employed so long as it deposits our novel compounds and compositions uniformly on the textile material.

The concentration of the novel compounds or compositions in the treating solution can be varied so that about 1 to about 20% of the particular durable press compound or composition, based on the weight of the textile material, is deposited thereon. The amount of the compound or composition deposited on the textile material will depend on the type of fabric being treated. For example, in treating fibrous cellulose textile materials, concentrations of about 1 to about 15%, based on the weight of the textile material of the compound or composition, have been found to give good durable press characteristics.

The compounds which can be employed as catalysts in the curing of our novel compounds and compositions to form the amino resins, described in detail hereinbelow, are well known to those skilled in the art concerning durable press compounds and amino resins. Such amino resin-forming compounds are acids of acid-yielding materials including inorganic acids such as hydrochloric, nitric, phosphoric and sulfuric acid; organic acids such as formic acid, oxalic acid, tartaric acid and trichloroacetic acid; amine hydrochlorides such as 2-methyl-2-aminopropanol hydrochloride and monoethanolamine hydrochloride; ammonium chloride; and acid-forming metallic salts such as magnesium chloride, zinc chloride, zinc nitrate, zinc acetate, zinc fluoroborate, aluminum nitrate. The concentration of catalyst employed may range from about 0.01 to about 25% or higher, based on the weight of the resin-forming compound or composition employed, depending upon the particular catalyst and curing conditions employed. For example, 0.1 to 10% of a free acid, 0.5 to 20% of ammonium chloride, 1.0 to 10% of an amine hydrochloride and about 0.01 to about 10% of a metallic salt may be used.

Following the application of the compound or composition and curing catalyst to the textile material, the material is exposed to drying and curing conditions to impart to the material durable press properties. The drying and curing operation may be carried out in one or two steps. Drying can be performed at ambient or elevated temperatures. Curing is accomplished by heating the treated cellulose material to heat of about 250° to about 500° F. for 2 seconds to about 4 minutes. The time and temperature necessary for curing are dependent on one another, the amino resin-forming catalyst employed, and on whether the drying and curing is carried out in one or two steps. Thus, an infinite combination of catalyst levels, curing temperatures, exposure times and catalysts may be employed. For example, when drying and curing is carried out in a combined operation, a time of from 1 minute to about 5 minutes and a temperature of about 300 to 400° F. can be employed. When the cellulose material has been dried prior to curing, time of about 1 to 3 minutes at a temperature of about 300 to about 400° F. gives good results.

The curing properties possessed by our novel compounds and compositions render them suitable for use in the "flash curing" technique of curing treated cellulose material in which very high temperatures such as about 400 to about 1200° F. and high production speed, i.e. short curing times such as 6 seconds, are employed. Drying and/or curing may be performed in a forced air oven or, when very high curing temperatures are desired, in an infa-red curing oven. Our novel compounds and compositions can also be used in the known post-cure procedure in which a cellulose-containing textile material is treated with one of our novel compounds or compositions and a curing catalyst and then dried, preferably at a temperature not above 250° F. Textile garments can be manufactured from the "sensitized" cellulose textile materials and then the compound or composition can be cured as described above to impart wrinkle-resistant properties to the garment.

The treating solution, i.e. the solution containing the curing catalyst and at least one of our novel compounds or compositions, may contain other auxiliary agents commonly employed in durable press finishing of textile materials. Softeners, wetting agents, handbuilders, scrooping agents, anti-soiling agents, optical brighteners, water repellants and flame retardants are examples of other chemicals which can be present in the treating solution. Typical of the softeners which can be used are silicone dispersions, polyethylene emulsions, fatty esters of glycerin, polyethylene glycol, sulfonated oils such as sulfonated olive oil, a formic acid emulsion of trialkanolaminomonostearate, and stearic acid-ethylene oxide condensates. Prior to the addition of the curing catalyst to the solution of our novel compound or composition, the pH of the solution should be adjusted to 7 or less, preferably about 5.5 to about 7.0.

Another aspect of our invention is the novel amino resins derived from our novel compounds and compositions. During the curing of the compound or composition on a cellulose-containing textile material, the water-soluble compound or composition is chemically affixed to the cellulose molecules due to the reaction of two or more hydroxymethyl groups of the compound or composition with two or more hydroxy groups of one or more cellulose chains. The desirable durable press properties which our novel compounds and compositions impart to cellulose-containing textile materials results from the cross-linking of the cellulose molecules by the residues of our novel compounds and the components of our novel compositions. The novel amino resins, consisting essentially of the residue of the compounds and compositions, may be monomeric, oligomeric or polymeric. The oligomeric amino resins result from the condensation of one of the compounds of Formula I with itself or the condensation of the components of our novel compositions with one another according to conventional polyglycol formation during the curing of the compounds on the cellulosic material. Since the novel compounds and at least some of the components of the novel compositions are di-, tri-, and tetra-functional, our novel oligomeric resins may be both linear and branch-chain. Although neither the occurrence nor the extent of oligomerization can be determined analytically, it is believed that the resins derived from the novel compositions are in part oligomeric while those derived from the novel compounds essentially are monomeric. The degree of polymerization of both the novel compounds and the components of the novel compositions can be increased significantly if a polymer-forming catalyst, such as zinc acetate or zirconium acetate, is applied with one of our novel compounds or compositions to a cellulose material followed by curing at a low temperature. A conventional amino resin-forming catalyst, such as that described previously, then can be applied to the polymer-containing cellulose material to effect cross-linking of the cellulose molecules.

Cellulose-containing textile materials and especially cotton and cotton-polyester textile materials exhibit good resistance to wrinkling and excellent tensile strength and abrasion resistance are obtained by the following procedure:

(a) About 6 to about 12%, based on the weight of the cellulosic material, of the composition obtained by:

(1) contacting acetaldehyde with urea in a urea:acetaldehyde mole ratio of about 2:3 at a temperature of about 30 to about 80° C. at a pH of about 0.5 to about 2 in the presence of water to form an intermediate condensate, and
(2) contacting the aqueous suspension of the intermediate condensate with about 1.75 to about 2.25 moles of formaldehyde per mole of urea used in Step (1) at a temperature of about 25 to about 55° C. and a pH of about 10 to about 12.5, an about 1 to about 10%, based on the weight of the composition, of zinc nitrate, magnesium chloride or zinc chloride, is applied to the cellulosic material;

(b) The cellulosic material is dried; and
(c) The cellulosic material then is heated to a temperature of about 280 to about 425° F. for about 6 to about 120 seconds.

The time required for curing Step (c) is inversely proportional to the temperature used. For example, a normal rate of curing requires the treated material to be heated to about 300 to about 340° F. for about 60 to about 90 seconds whereas rapid curing rates in which the treated material is heated for about 5 to about 15 seconds utilizes temperatures of about 375° to about 425° C. or higher.

The preparation of our novel compounds, compositions, amino resins, wrinkle-resistant cellulose-containing textile materials and textile finishing compositions is further illustrated by the following examples. All percentages are by weight unless stated otherwise.

EXAMPLE 1

A mixture of 1782 g. (9.0 moles) of hexahydro-4,5-dimethylpyrimido[4,5 - d]pyrimidine-2,7-(1H,3H)dione, 3430 g. (41.7 moles) of a 36.5% formalin solution, 574 g. of water, 15.2 g. of sodium bicarbonate and 19.2 g. sodium carbonate is stirred and heated to 55° C. for one hour and held at 55 to 57° C. for two additional hours. The resulting solution is cooled to give a solution containing 49% solids, mostly poly-N-methylol hexahydro-4,5-dimethylpyrimido[4,5-d]pyrimidine - 2,7 - (1H,3H) dione. When 435 g. of this solution is allowed to stand at 25° C. for several days, 37.0 g. of a N,N',N''-trimethylolhexahydro-4,5-dimethylpyrimido[4,5 - d]pyrimidine-2,7-(1H,3H)dione separates and is recovered by filtration and dried under vacuum. This compound melts and polymerizes at about 205° C., depending on the rate of heating.

*Analysis.*—Calcd. for $C_{11}H_{20}N_4O_5$ (percent): C, 45.8; H, 7.0; N, 19.4; combined $CH_2O$, 31.3. Found (percent): C, 46.2; H, 7.1; N, 19.5; combined $CH_2O$, 31.4.

EXAMPLE 2

Following the general directions of Example 1, 158 g. (0.8 mole) of hexahydro-4,5-dimethylpyrimido[4,5-d] pyrimidine-2,7-(1H,3H)dione, 164 g. (2.0 moles) of 36.5% formalin, 1.35 g. sodium bicarbonate, 1.71 g. of sodium carbonate, and 135 ml. of water gives a solution containing about 45% of N,N'-dimethylolhexahydro-4,5-dimethylpyrimido[4,5-d]pyrimidine-2,7-(1H,3H)dione.

EXAMPLE 3

To a stirred solution of 960 g. (16 moles) of urea and 320 ml. of concentrated hydrochloric acid in 1440 ml. of water, at an initial temperature of 13° C., is added 1060 g. (24 moles) of acetaldehyde during 45 minutes. The reaction is exothermic and cooling is used to maintain a temperature of 50 to 55° C. This temperature is maintained for an additional 30 minutes and then lowered to 25° C. during 1.5 hours. The resulting suspension is neutralized to pH 7 with 608 g. of 25% aqueous sodium hydroxide, made basic (pH 10.5) with 13.5 g. of sodium bicarbonate and 17.0 g. of sodium carbonate, and treated with 3000 g. (36 moles) of 36% aqueous formaldehyde. The temperature is raised to 50° C. during 30 minutes and maintained at 50 to 55° C. for 2 hours. The resulting clear solution contains about 2540 g. of solids of which approximately 50% is poly-N-methylol hexahydro-4,5-dimethylpyrimido[4,5-d]pyrimidine - 2,7 - (1H,3H)dione, 25% of which is believed to be poly-N-methylol hexahydro-4-methyl-6-ureido-2-pyrimidone, and 25% of which is methylolated unknowns. The assumption that the product obtained contains approximately 50% of the dione compound is based upon the amount of hexahydro-4,5-dimethylpyrimido[4,5-d]pyrimidine - 2,7 - (1H,3H)dione which is isolated from the products obtained by the condensation of urea and acetaldehyde as described above.

Each of the examples in Table I is a repetition of the general procedure employed in Example 3 with various changes in the process variables. Each of the compositions obtained from Examples 4 through 16 impart durable press properties to cellulosic textile materials.

TABLE I

| Ex. No. | Moles CH₃CHO | Moles Urea | Amt. H₂O ml. | Acid, amt., ml. | Time, hrs. | Max. temp., °C. | pH | Amt. HCHO, moles | Temp., °C. | Time, hrs. |
|---|---|---|---|---|---|---|---|---|---|---|
| 4 | 24 | 16 | 1,440 | HCl, 320 | 2 | 55 | 10.5 | 36 | 55 | 2 |
| 5 | 24 | 16 | 1,440 | HCl, 320 | 2 | 55 | 10.5 | 20 | 55 | 2 |
| 6 | 24 | 16 | 1,440 | HCl, 64 | 2 | 55 | 10.5 | 36 | 55 | 2 |
| 7 | 32 | 16 | 1,440 | HCl, 320 | 2 | 55 | 10.5 | 36 | 55 | 2 |
| 8 | 24 | 16 | 700 | HCl, 320 | 2 | 55 | 10.5 | 36 | 55 | 2 |
| 9 | 24 | 16 | 1,440 | H₂SO₄, 30 | 2 | 55 | 10.5 | 36 | 55 | 2 |
| 10 | 24 | 16 | 1,440 | HCl, 320 | 1 | 120 | 10.5 | 36 | 55 | 2 |
| 11 | 24 | 16 | 1,440 | HCl, 320 | 4 | 10 | 10.5 | 36 | 55 | 2 |
| 12 | 24 | 16 | 1,440 | H₃PO₄, 100 | 2 | 55 | 10.5 | 36 | 55 | 2 |
| 13 | 24 | 16 | 1,440 | HCl, 320 | 2 | 55 | 12.0 | 36 | 25 | 3 |
| 14 | 24 | 16 | 1,440 | HCl, 320 | 2 | 55 | 9.5 | 36 | 100 | 0.5 |
| 15 | 24 | 16 | 1,000 | H₂SO₄, 10 | 5 | 100 | 10.5 | 36 | 55 | 2 |
| 16 | 20 | 16 | 1,440 | HCl, 320 | 2 | 55 | 10.5 | 36 | 55 | 2 |

EXAMPLE 17

To a 22 liter, 3-neck flask fitted with stirrer, thermometer, dropping funnel, and Dry Ice-isopropanol condensor is added 3432 g. water, 1338 g. of 32% hydrochloric acid, and 2880 g. (48.0 mole) urea. 3180 g. (72 mole) acetaldehyde is added over a 100-minute period. The exothermic reaction is kept at 48 to 52° C. with an ice-water bath. The temperature is maintained at about 50° C. for an additional 30 minutes, then lowered to 30 to 35° C. over a two-hour period and finally lowered to 25° C. The resulting suspension is neutralized to pH 7.0 by the addition of 964.8 g. of 50% sodium hydroxide solution. The reaction mixture is cooled to ambient temperatures, the pH adjusted to about 12.5 by the addition of 90.3 g. of 50% sodium hydroxide solution, and then 2880 g. (96.0 moles) of flake paraformaldehyde is added. The reaction mixture is heated at 30 to 35° C. for 50 minutes and then heated at about 50° C. for 2 hours 15 minutes. The mixture is then cooled to below 30° C. and neutralized to a pH of about 7.0 with 83.9 g. of 32% hydrochloric acid. Employing 90 g. of a filtering aid, the reaction mixture is filtered under vacuum to obtain 14.3 kg. of a clear solution calculated to contain approximately 51.3% solids consisting essentially of poly-N-methylol hexahydro-4,5-dimethylpyrimido[4,5-d]pyrimidine - 2,7 - (1H,3H)dione and poly-N-methylol coproducts.

EXAMPLE 18

According to the procedure described in Example 17, 480 g. (8.0 moles) urea and 530 g. (12.0 moles) acetaldehyde are condensed in the presence of 540 g. water and 223 g. of 32% hydrochloric acid. The reaction mixture is cooled and 185.7 g. of 50% sodium hydroxide solution is added to give a pH of 11.7. Then 420 g. (about 14.0 moles) of flake paraformaldehyde is added followed by 30.5 g. of 50% sodium hydroxide solution. The mixture is brought to 80° C. over a 45-minute period and held at that temperature for two hours. To the cooled reaction mixture, having a pH of about 8.8, is added 3.2 g. of a plant hydrochloric acid to give a pH of 7.1. The mixture is then filtered under vacuum to obtain 2359 g. of clear solution containing approximately 50.3% of the solids described in Example 17.

EXAMPLE 19

The synthesis described in Example 18 is repeated except that the reaction mixture is heated at about 50° C. for ten hours after the addition of the paraformaldehyde. The clear solution obtained by filtering the reaction mixture contains 49.8% solids consisting essentially of the poly-N-methylol compounds described in Example 17.

EXAMPLE 20

To a stirred solution of 148 g. (2 moles) of methylurea and 40 ml. of 37% hydrochloric acid in 180 ml. of water, at an initial temperature of 20° C., 180 ml. (3.2 moles) of acetaldehyde is added during 25 minutes. The reaction is exothermic and cooling is used to maintain a temperature of 55° C. A solid forms near the end of the addition. The temperature is maintained at 55° C. for an additional one hour and then lowered slowly to 25° C. to give 80 g. (35%) of hexahydro - 4,5 - dimethyl-N,N-dimethylpyrimido[4,5-d]pyrimidine - 2,7 - (1H,3H)dione, M.P. 309–311° C. Recrystallization from 700 ml. of boiling water gives 53 g. (23%) of crystals, M.P. 311–319° C. (decomp.).

*Analysis.*—Calcd. for $C_{10}H_{18}N_4O_2$ (percent): C, 53.1; H, 8.0; N, 24.8. Found (percent): C, 53.2; H, 8.0; N, 24.8.

An additional quantity of product precipitates from the filtrate when it is treated with $NaHCO_3$ solution. Treatment of the dione obtained with 2 moles of formaldehyde yields the compound hexahydro-4,5-dimethyl-N,N-dimethyl - N,N - dihydroxymethylpyrimido[4,5 - d]pyrimidine-2,7-(1H,3H)dione.

EXAMPLE 21

To a stirred solution of 480 g. (8 moles) of urea and 150 ml. of concentrated hydrochloric acid in 720 ml. of water, at an initial temperature of 15° C., is added 528 g. (12.0 moles) of acetaldehyde during 45 minutes. The exothermic reaction is held at 50° C. by a cooling bath. A temperature of 40 to 50° C. is maintained for 2 hours. The resulting suspension is cooled to 0° C. and neutralized to pH 7 with 25% aqueous sodium hydroxide. The resulting suspension is filtered to remove 439 g. of hexahydro-4,5- dimethylpyrimido[4,5-d]pyrimidine - 2,7 - (1H,3H)dione dihydrate. To the filtrate is added 3.38 g. of sodium bicarbonate, 4.26 g. of sodium carbonate and 722 g. (9.0 moles) of 37% aqueous formaldehyde. The solution, which has a pH of about 10, is heated at 50° C. for 2 hours. The resulting solution is clear, light colored and contains a mixture of about 12% of poly-N-methylol hexahydro-4,5 - dimethylpyrimido[4,5-d]pyrimidine-2,7- (1H,3H)dione and 40 to 50% each of poly-N-methylol (hexahydro-6-methyl-2-oxo-4-pyrimidinyl)urea and methylolated unknowns.

EXAMPLE 22

To a stirred solution of 180 g. (3.0 moles) of urea and 60 ml. of concentrated hydrochloric acid in 270 ml. of water is added 261 g. (4.5 moles) of propionaldehyde during 45 minutes. The exothermic reaction is controlled at 45 to 50° C. by a cooling bath during the addition. After 1 hour a solid precipitates. The reaction mixture is kept at 50° C. for 1 hour, then cooled to 30° C. during 2.5 hours. After this time, it is neutralized to pH 7 using 25% aqueous sodium hydroxide, then made basic by the addition of 2.54 g. of sodium bicarbonate and 3.2 g. of sodium carbonate, and treated with 540 g. (6.75 moles) of 37% aqueous formaldehyde. This mixture is held at 50° C. for 2.5 hours. The resulting solution is a clear light straw yellow solution.

EXAMPLE 23

To a stirred solution of 180 g. (3.0 moles) of urea and 60 ml. of concentrated hydrochloric acid in 135 ml. of water and 135 g. of methanol is added 324 g. (4.5 moles) of distilled n-butyraldehyde over a period of 40 minutes. The solution is stirred for 1.5 hours at 40 to 50° C., neutralized to pH 7 with sodium hydroxide and then 2.54 g. of sodium bicarbonate and 3.20 g. of sodium carbonate are added. Finally 540 g. (6.75 moles) of 37% aqueous formaldehyde is added and the solution stirred at 50 to 54° C. for 2.5 hours. The resulting solution is almost colorless.

EXAMPLE 24

To a stirred solution of 960 g. (16 moles) of urea and 320 ml. of concentrated hydrochloric acid in 1440 ml. of water, at an initial temperature of 13° C., is added 704 g. (16 moles) of acetaldehyde during 30 minutes. The reaction is exothermic and cooling is used to maintain a temperature of 50 to 55° C. The resulting suspension is neutralized to pH 12.5 with aqueous sodium hydroxide, and then 1200 g. (40 moles) of paraformaldehyde is added. The reaction mixture is heated at 30 to 35° C. for 50 minutes and then heated at about 50° for 6 hours. The mixture is then cooled to 30° C. and neutralized to pH of about 7.0 using hydrochloric acid. The resulting material is an aqueous solution of solids consisting of about 30–40% poly-N-methylol(hexahydro-6-methyl-2-oxo-4-pyrimidinyl)urea, 30–40% of the poly-N-methylol dione, and 20–40% of poly-N-methylol co-products.

EXAMPLE 25

To a stirred mixture of 172 g. (1.0 mole) of hexahydro-6-methyl-2-oxo-4-pyrimidinylurea, 75 ml. of concentrated hydrochloric acid and 150 ml. of water is added 44 g. (1.0 mole) of acetaldehyde over a period of 30 minutes. The reaction temperature is controlled at 50° C. during the addition and for 2 hours in addition. The reaction is cooled to ambient temperatures and the pH adjusted to 12.5 by the addition of 50% sodium hydroxide solution and then 120 g. (4 moles) of paraformaldehyde is added. The mixture is heated at 30 to 35° C. for 1 hour and at 50° C. for 2 hours. The mixture is then cooled to 25° C. and the pH adjusted to 7.0 with hydrochloric acid. The resulting clear solution contains poly-N-methylol hexahydro-4,5-dimethylpyrimido[4,5-d]pyrimidine - 2,7 - (1H,3H) dione and poly-N-methylol co-products.

EXAMPLE 26

To a stirred mixture of 172 g. (1.0 mole) of hexahydro-6-methyl-2-oxo-4-pyrimidinylurea, 75 ml. of concentrated hydrochloric acid and 150 ml. of water is added 58 g. (1.0 mole) of propionaldehyde over a period of 45 minutes. The reaction temperature is controlled at 55° C. during the addition and for 3 hours in addition. The reaction mixture is cooled to ambient temperatures and the pH adjusted to 12.5 by the addition of 50% sodium hydroxide solution, and then 120 g. (4 moles) of paraformaldehyde is added. The mixture is heated at 30 to 35° C. for 1 hour and at 50° C. for 2 hours. The mixture is then cooled to 25° C. and the pH adjusted to 7.0 with hydrochloric acid. The clear solution consists essentially of poly-N-methylol hexahydro-4-ethyl-5-methylpyrimido [4,5-d]pyrimidine-2,7 - (1H,3H)dione and poly-N-methylol co-products.

EXAMPLE 27

To a mixture of 180 g. urea, 270 ml. water and 71.4 g. hydrochloric acid is added 198 g. acetaldehyde over a 30-minute period at 50 to 55° C. Heating at 50° C. is continued for an additional 30 minutes and the temperature of the reaction mixture is allowed to decrease to 25° C. over a 3-hour period. The pH of the mixture is adjusted to about 2.8 with 110 g. of 25% sodium hydroxide solution, 542 g. of 37.4% formalin solution is added and the mixture is heated at 54° C. for 4 hours. The resulting amber solution is believed to contain about 30 to 40% of N-methylol compounds, of which 30–40% is poly-N-methylol hexahydro-4,5 - dimethylpyrimido[4,5-d]pyrimidine-2,7(1H,3H)dione, 30–40% is the poly-N-methylol dione, and 20–40% is poly-N-methylol co-products.

EXAMPLE 28

123 g. of a 50% solution of poly-N-methylol hexahydro - 4,5 - dimethylpyrimido[4,5-d]pyrimidine - 2,7- (1H,3H)dione, prepared according to Example 1, is diluted with an equal volume of water and adjusted to a pH of 5.5 with acetic acid. A pad bath is prepared consisting of the above solution, 24.6 g. of a 30% aqueous zinc nitrate solution, 1.0 g. of a non-ionic wetting agent and enough water to give a total solution weight of 492 g. A sample of 100% cotton print cloth (80" x 80") is padded through the resin bath at 120° F. to obtain a wet pick-up of approximately 60% (about 7.5% of resin add-on). The treated fabric is then dried at 220° F. and cured at 340° F. for 90 seconds. Wrinkle recovery, as determined by the standard wrinkle recovery test (AATCC–66–1968), shows a value of 300° (W and F) as opposed to 190° (W and F) for an unfinished cotton control. The resulting cloth has a good white color, good hand, good resistance to laundering and does not yellow upon ironing after exposure to household bleaching solutions.

EXAMPLE 29

A 100% cotton fabric sample is padded in a bath containing 96 g. of a 45% solution of N,N'-dimethylol hexahydro-4,5 - dimethylpyrimido[4,5-d]pyrimidine-2,7-(1H, 3H)-dione prepared as described in Example 2, 19.0 g. of a 25% zinc nitrate solution and 0.8 g. of a non-ionic wetting agent in 269 g. water. The treated fabric is dried, cured and evaluated as described in Example 28. The finished fabric has a wrinkle recovery value of 269° (W and F) versus 190° (W and F) for the unfinished cotton control.

EXAMPLE 30

A poly-N-methylol hexahydro - 4,5-dimethylpyrimido [4,5-d]pyrimidine-2,7-(1H,3H)dione is prepared by reacting formaldehyde with the corresponding unmethylolated dione in a molar ratio 5:1 according to the procedure employed in Example 1. A solution consisting of 25% of the polymethylol dione, 5% of a 25% zinc nitrate solution and 0.2% non-ionic wetting agent, adjusted to a pH of 5.5 with acetic acid, is applied to a cotton fabric as described in Example 28. The padded fabric is dried at 220° F., and cured at 340° F. for 90 seconds. The finished fabric has a wrinkle recovery value of 283° (W and F) while the unfinished cotton control has a value of 192° (W and F).

EXAMPLE 31

According to the procedure described in Example 30, poly-N-methylol hexahydro-4,5-dimethylpyrimido[4,5-d]pyrimidine-2,7-(1H,3H)dione, prepared by treating hexahydro - 4,5-dimethylpyrimido[4,5-d]pyrimidine-2,7-(1H,3H)dione with formaldehyde in a ratio of 3.5 moles formaldehyde per mole of dione, is applied to a cotton fabric. The finished fabric has a wrinkle recovery value of 267° (W and F), while the unfinished cotton control has a value of 175° (W and F).

EXAMPLE 32

A pad bath containing 25% (125 g.) of 50% solution of the compound prepared as described in Example 1, 5% (25 g. of 25% solution) zinc nitrate, 0.5% (2.5 g.) of a non-ionic wetting agent, and 69.5% water is prepared and applied, at 120° F. (60% wet pick-up), to a 100% cotton fabric. The fabric is dried at 220° F. and then 21 samples of the fabric are cured for the periods and at the temperatures set forth below. The wrinkle recovery values of the finished samples are determined as described hereinabove.

| Temperature, °F. | Time | Wrinkle recovery (W and F), degrees |
| --- | --- | --- |
| 320 | 90 seconds | 270 |
| 320 | 2 minutes | 279 |
| 320 | 3 minutes | 284 |
| 340 | 30 seconds | 277 |
| 340 | 60 seconds | 279 |
| 340 | 90 seconds | 290 |
| 340 | 2 minutes | 288 |
| 340 | 3 minutes | 293 |
| 340 | 4 minutes | 303 |
| 350 | 30 seconds | 290 |
| 350 | 60 seconds | 291 |
| 350 | 90 seconds | 290 |
| 350 | 2 minutes | 294 |
| 350 | 3 minutes | 290 |
| 350 | 4 minutes | 304 |
| 380 | 30 seconds | 293 |
| 380 | 60 seconds | 291 |
| 380 | 90 seconds | 294 |
| 380 | 2 minutes | 294 |
| 380 | 3 minutes | 292 |
| 380 | 4 minutes | 293 |

The above data show that our novel compounds tend to cure rapidly. For example, the wrinkle recovery results obtained by curing at 350° F. for 30 seconds are comparable to those obtained at 340° F. for 90 seconds or at 380° F. for 30 seconds. This rapid cure property is advantageous in "flash curing" system commonly used by textile finishing plants to increase production.

EXAMPLE 33

A pad bath containing: (a) 25% (5,000 g.) of a 45% solution of the polymethylol dione resin prepared as described in Example 1 (pH adjusted to 5.5 with acetic acid), (b) 5% (1,000 g. of a 25% solution) zinc nitrate, (c) 0.2% (40 g.) of a non-ionic wetting agent, and (d) 13,960 g. water is prepared. A blanket consisting of a 100% cotton fabric portion, a 100% rayon fabric portion and a 50/50 poly(ethylene terephthalate)-cotton blend fabric portion is padded in the bath at 120° F. The blanket is dried at 220° F. on a tenter frame and then cured at 350° F. for 90 seconds. The wrinkle recovery values of the three different fabric portions are described below.

Finished fabric:  Wrinkle recovery total degrees (W and F)
  100% cotton _____ 270
  100% rayon _____ 320
  50/50 cotton-polyester blend _____ 282
Unfinished fabric:
  100% cotton _____ 175
  100% rayon _____ 266
  50/50 cotton-polyester blend _____ 226

The fabric of 50/50 polyester-cotton blend has washed appearance ratings (AATCC 88A–1964T) of 3.3, 3.5 and 3.5 after undergoing 2, 3 and 5 laundry cycles (140° F.), respectively.

EXAMPLE 34

Eleven samples of a cotton fabric finished as described in Example 28 are placed in 0.02 N-hydrochloric acid. Every five minutes one of the samples is removed, rinsed, neutralized and dried. The wrinkle recovery value for each sample is then determined. The results, summarized below, establish that poly-N-methylol hexahydro-4,5-dimethylpyrimido[4,5-d]pyrimidine-2,7-(1H,3H)-dione exhibits excellent resistance to acid hydrolysis.

| Sample exposure time, minutes: | Wrinkle recovery (W and F), degrees |
| --- | --- |
| 5 | 246 |
| 10 | 270 |
| 15 | 220 |
| 20 | 281 |
| 25 | 247 |
| 30 | 268 |
| 35 | 256 |
| 40 | 252 |
| 45 | 254 |
| 50 | 247 |
| 55 | 249 |

The wrinkle recovery value for an unexposed, unfinished cotton control fabric is 175° (W and F).

EXAMPLE 35

A cotton fabric is padded with a poly-N-methylol dione resin and portions of the treated fabric are dried and cured as described in Example 28 except that varying amounts of zinc nitrate catalyst are used. The wrinkle recovery values of the fabric samples containing or padded with different amounts of catalyst are:

| Catalyst concentration: | Wrinkle recovery (W and F), degrees |
| --- | --- |
| 5% (25% zinc nitrate solution) | 278 |
| 6% (25% zinc nitrate solution) | 277 |
| 7% (25% zinc nitrate solution) | 284 |
| 8% (25% zinc nitrate solution) | 286 |
| 10% (25% zinc nitrate solution) | 287 |
| 12% (25% zinc nitrate solution) | 290 |
| Unfinished cotton control | 186 |

The above values show that no significant improvements result from the use of catalyst concentrations higher than those used in the preceding examples.

EXAMPLE 36

Samples of 100% cotton fabric are treated with a resin solution as described in Example 28 except that the concentration of the poly-N-methylol dione compound in the pad bath is varied. The aqueous solutions used contain:

X% of a 50% solution of dione resin;
⅕X% of a 25% zinc nitrate solution;
0.2% non-ionic wetting agent; and
pH 5.5 with acetic acid.

The treated fabric samples are dried at 220° F. and cured at 340° F. for 90 seconds. The wrinkle recovery values for the fabric samples treated with different amounts of dione resin are:

| X% resin: | Wrinkle recovery (W and F), degrees |
|---|---|
| 10 | 267 |
| 15 | 282 |
| 20 | 297 |
| 25 | 294 |
| Unfinished cotton control | 203 |

The wrinkle recovery values show that the novel dione compounds are effective durable press resins when present on cotton fabrics in widely varying amounts.

EXAMPLE 37

Samples of cotton fabric treated, dried and cured as described in Example 28 are immersed in 0.3 N sodium hydroxide at 140° F. for 1 hour. The dried sample has a wrinkle recovery value of 255° (W and F), as compared to a value of 277° for an identical resin-finished fabric which is not exposed to sodium hydroxide, which demonstrates that the novel N-methylol dione compounds are resistant to alkaline hydrolysis.

EXAMPLE 38

Samples of cotton fabric which are resin finished as described in Example 28 are tested for chlorine retention according to AATCC Standard Test Method 92-1967. The samples exposed to hypochlorite bleach are scorched and tested for strength loss as described in the test. The fabrics retain their whiteness in the scorched areas and lose only about 5% tensile strength which is comparable to the tensile strength loss of an unfinished cotton sample tested in the same manner. The chlorine retention properties of the novel dione resins can be improved by the addition of chemicals commonly used in conjunction with known textile resins for that purpose.

EXAMPLE 39

To determine the usefulness of the novel dione compounds for post-cure applications, cotton fabric samples are treated with a dione resin as described in Example 28. The treated samples are dried at 220° F. but are not cured. These sensitized samples are stored for four months (65% relative humidity and 70° F.) and then cured at 330° F. for 15 minutes. The samples have a wrinkle recovery value (W and F) of 277°, as compared to a value of 242° (W and F) for a treated but uncured sample which had also been stored for four months. These results show that the novel resins are stable to storage.

EXAMPLE 40

The novel dione compounds do not affect detrimentally the light-fastness of dyes which are applied to the finished cotton fabrics. Using the dyes listed below, cotton fabric samples are dyed with the dyes listed below and then a portion of each of the dyed fabrics is finished as described in Example 28. The dyed, resin-finished samples and the dyed, untreated control fabrics are exposed to a Fade-Ometer according to the standard light-fastness test. The following results are obtained:

| | | Hours light-fastness | | |
|---|---|---|---|---|
| | | Resin finished | | |
| Percent dyeing | Dye | Zinc nitrate catalyst | Magnesium chloride catalyst | Unfinished control |
| 2.0 | Superlitefast Gray LVL. | 20 | 20 | 20 |
| 0.2 | do | 20 | 20 | 20 |
| 1.0 | Vat Blue 6 | 40 | 40 | 40 |
| 5.0 | do | 40 | 40 | 40 |
| 2.0 | Direct Blue 191 | 20 | 20 | 20 |
| 0.2 | do | 20 | 20 | 20 |
| 2.0 | Sol-Aqua-Fast Red RL | 20 | 20 | 20 |
| 0.2 | do | 20 | 20 | 20 |
| 1.0 | Vat Brown 3 | 20 | 20 | 20 |
| 5.0 | do | 20 | 20 | 20 |
| 5.0 | Vat Orange 4 | 20 | 20 | 20 |

EXAMPLE 41

A pad bath containing 444 g. of a 34% solids solution from Example 3, 80 g. of a 25% zinc nitrate solution, 2 g. of a non-ionic wetting agent and 456 ml. water is prepared. The pH of the dilute resin solution is lowered to 5.5 with acetic acid before addition of the catalyst. The catalyst is also diluted with water before addition to the resin bath. A sample of 100% cotton print cloth is padded through the resin bath (120° F.) to obtain a wet pick-up of approximately 60% (about 7% resin solids add-on). The treated fabric is then dried at 220° F. and cured at 330° F. for 90 seconds. The resin-finished fabric has a wrinkle recovery value of 296° (W and F) whereas unfinished cotton control has a value of 213°.

EXAMPLE 42

A pad bath containing 133 g. of a 34% solids solution of the resin from Example 3, 24 g. of a 10% zinc nitrate solution, 0.6 g. of a non-ionic wetting agent and 143 g. of water is prepared. The pH of the diluted product is lowered to 5.5 with dilute (25%) hydrochloric acid before addition of the catalyst. A sample of 100% cotton print cloth is padded through the resin bath (120° F.) to obtain a wet-pickup of approximately 60% (about 9% solids on the weight of the fabric). The treated fabric is dried at 220° F. and cured at 330° F. for 90 seconds. The resin-finished cotton fabric has a wrinkle recovery value of 294° while an unfinished cotton control fabric has a wrinkle recovery value of 192°.

EXAMPLE 43

Samples of a 100% cotton broadcloth and a fabric woven from yarn containing 65% poly(ethylene terephthalate) fibers and 35% cotton fibres are padded (55% wet-pick-up for the cotton fabric and 65% for the polyester/cotton fabric based on the weight of the fabric) in a bath containing:

22.4% of the solution prepared in Example 18 (pH adjusted to 5.5);
7.0% of a 10% zinc nitrate solution;
0.2% wetting agent (Igepon T-51) sodium N-methyl-N-oleoyl taurate an anionic surfactant;
2.0% of a 20% polyethylene emulsion softener (Icopol A-99) a product of Whitestone Chemical Co.; and
63.7% water.

The padded fabrics are dried at 240° F. in a horizontal position and cured for 90 seconds at 340° F. The fabrics are then after-washed in a solution containing 1 g./l. tetrasodium pyrophosphate and 0.5 g./l. Igepon T-51 sodium N-methyl-oleoyl taurate, an anionic surfactant at 120° F. for one minute. The test data set forth below show that 100% cotton and polyester/cotton materials treated with one of our compositions exhibit good resistance to wrinkling and excellent tensile strength and abrasion resistance.

| | 100% cotton fabric | Polyester/ cotton fabric |
|---|---|---|
| Wrinkle recovery (degrees): | | |
| Warp | 129 | 138 |
| Filling | 128 | 135 |
| Total | 257 | 273 |
| Ravel strip tensile strength (pounds), ASTM D1682-641R: | | |
| Warp | 56.7 | 120.2 |
| Filling | 25.1 | 56.8 |
| Elmendorf tear (g.), ASTM D1424-63: | | |
| Warp | 1,300 | 3,200 |
| Filling | 900 | 1,500 |
| Differential wear (AATCC 119-1967T), 1,200 cycles | | 4.0+ |

EXAMPLE 44

Cotton and cotton-polyester fabrics are treated and cured as described in Example 43 except that 22.6% of the solution prepared in Example 19 is used in the bath.

The wrinkle recovery, tensile strength and abrasion resistance of both types of fabrics treated with the composition of Example 19 are set forth below.

|  | 100% cotton fabric | Polyester/cotton fabric |
|---|---|---|
| Wrinkle recovery (degrees): |  |  |
| Warp | 125 | 146 |
| Filling | 125 | 131 |
| Total | 250 | 277 |
| Ravel strip tensile strength (pounds), ASTM D1682–641R: |  |  |
| Warp | 57.8 | 116.7 |
| Filling | 24.9 | 52.5 |
| Elmendorf tear (g.): |  |  |
| Warp | 1,200 | 3,200 |
| Filling | 800 | 1,600 |
| Differential wear (AATCC 119–1967T), 1,200 cycles |  | 4.0+ |

EXAMPLE 45

Samples of 100% cotton fabric are padded in a bath containing varying concentrations of resin and catalyst. Eight baths containing "X" g. of a 34% solids solution of the resin prepared as described in Example 3 (the pH of which was adjusted to 5.5 with dilute HCl), "Y" g. of zinc nitrate (10% solution), 0.6 g. of a non-ionic wetting agent, and "Z" g. water. A cotton fabric is padded in one of the baths, dried and cured as described in the preceding example and then wrinkle recovery values of the resin-finished fabrics and an unfinished cotton control fabric are determined. The composition of each of the eight baths, the wrinkle recovery value of a resin-finished fabric padded in the particular bath, and the wrinkle recovery value of the unfinished cotton control are set forth in Table II. These values indicate that the optimum resin solids level on the fabrics is approximately 7.5% to 9% based on the weight of the fabric.

TABLE II

| Bath: | Resin solids in bath, percent | X (resin, g.) | Y (catalyst, g.) | Z (water, g.) | Solids on fabric, percent | Wrinkle recovery value (W and F), degrees |
|---|---|---|---|---|---|---|
| 1 | 2.5 | 22 | 4 | 274 | 1.5 | 226 |
| 2 | 5.0 | 44 | 8 | 248 | 3.0 | 244 |
| 3 | 7.5 | 66 | 12 | 222 | 4.5 | 254 |
| 4 | 10.0 | 88 | 16 | 196 | 6.0 | 277 |
| 5 | 12.5 | 110 | 20 | 170 | 7.5 | 302 |
| 6 | 15.0 | 133 | 24 | 143 | 9.0 | 311 |
| 7 | 17.5 | 155 | 28 | 117 | 10.5 | 309 |
| 8 | 20.0 | 177 | 32 | 91 | 12.0 | 300 |
| Unfinished cotton control fabric |  |  |  |  |  | 210 |

EXAMPLE 46

The procedure described in Example 45 is repeated except that 133 g. of a 34% solids solution of the resin is used in each of the eight baths and the concentration of catalyst and the amount of water are varied. The wrinkle recovery data set forth below for the resin-finished samples indicate that the optimum catalyst level for the best wrinkle recovery performance is approximately 5 to 6% solid zinc nitrate based on the weight of the resin solid.

| Bath: | X (catalyst, g.) | Z (water, g.) | Catalyst level based on resin solids, percent | Wrinkle recovery value (W and F), degrees |
|---|---|---|---|---|
| 1 | 9 | 158 | 2.0 | 223 |
| 2 | 12 | 155 | 2.6 | 221 |
| 3 | 15 | 152 | 3.3 | 251 |
| 4 | 18 | 149 | 4.0 | 255 |
| 5 | 21 | 146 | 4.6 | 258 |
| 6 | 24 | 143 | 5.3 | 263 |
| 7 | 27 | 140 | 6.0 | 284 |
| 8 | 30 | 137 | 6.6 | 281 |

EXAMPLE 47

Samples of 100% cotton fabric are padded through a bath containing 444 g. of a 34% solids solution of the resin prepared in Example 3 (the pH of which was adjusted to 5.5 with dilute HCl), 80 g. of a 10% solution of zinc nitrate, 2.0 g. of a non-ionic wetting agent, and 474 g. water. The treated samples are dried at 200° F. and then are cured at different temperatures for different periods of time. The wrinkle recovery values of the thus finished resins indicate that the optimum curing temperature is 330° F. for about 60 to 120 seconds. An unfinished cotton control fabric has a value (W and F) of 213°.

| Curing time | Wrinkle recovery values (degrees) of samples cured at— | | | | |
|---|---|---|---|---|---|
|  | 320° F. | 330° F. | 340° F. | 350° F. | 380° F. |
| 4 minutes | 298 | 303 | 312 | 305 | 314 |
| 3 minutes | 298 | 304 | 300 | 304 | 305 |
| 2 minutes | 295 | 307 | 304 | 309 | 305 |
| 90 seconds | 290 | 296 | 296 | 303 | 307 |
| 60 seconds | 284 | 300 | 301 | 301 | 309 |
| 30 seconds |  |  | 288 | 298 | 305 |

EXAMPLE 48

A pad bath containing 8823 g. of a 34% solids solution of the resin prepared in Example 3 (the pH of which was adjusted to 5.5 with dilute HCl), 1600 g. of a 10% zinc nitrate solution, 40 g. of a non-ionic wetting agent, and 11,537 g. of water is prepared. A blanket containing a portion of 100% rayon fabric, 100% cotton fabric and a fabric portion of 50/50 poly(ethylene terephthalate)-cotton fibers is padded through the bath at 110° F. to obtain a wet-pick-up of 70% based on the weight of the fabric. The fabrics are dried on a tenter frame at 220° F. and then cured at 330° F. for 90 seconds. The fabrics are evaluated for wrinkle recovery and washed appearance (AATCC Standard Test Method 88A-1964 III-C-2). The results, set forth below, of those tests establish that our novel resins improve the washed appearance of fabrics treated therewith. The novel resins also produce a desirable, firm hand to the cotton-polyester blend fabric.

| Fabric | Wrinkle recovery value, degrees | Washed appearance ratings after— | | |
|---|---|---|---|---|
|  |  | 1 wash | 3 washes | 5 washes |
| Unfinished cotton | 194 | 1.0 | 1.0 | 1.0 |
| Resin-Finished cotton | 284 | 3.0 | 3.2 | 3.2 |
| Unfinished rayon | 247 | 2.0 | 2.0 | 2.0 |
| Resin-finished rayon | 273 | 2.5 | 2.5 | 2.5 |
| Unfinished cotton-polyester blend |  | 3.0 | 3.0 | 3.0 |
| Resin-finished cotton-polyester blend |  | 4.5 | 4.5 | 4.0 |

EXAMPLE 49

A 100% cotton fabric is finished by the method described in Example 48 and tested, according to standard methods, for wrinkle recovery, tensile strength and abrasion resistance. The test results given below show that cellulosic textile materials treated with one of our novel compositions possess excellent tensile strength and abrasion resistance properties.

| Cotton fabric | Wrinkle recovery value, degree | Raveled strip tensile ASTM D1682-641R (pounds) | | Stoll flex abrasion cycles ASTM D1175-64T | |
|---|---|---|---|---|---|
| | | Warp | Filling | Warp | Filling |
| Unfinished control | 192 | 49 | 38 | 3,216 | 2,348 |
| Novel resin-treated | 294 | 34 | 24 | 763 | 1,150 |

The abrasion resistance can be improved by incorporating a polyethylene emulsion softener into the resin finish formulation. Two cotton fabrics are finished as described above except that the resin-finished fabrics are top softened by padding through a 5% solution of a 20% polyethylene emulsion and drying at 220° F. The test data listed below show the improvements resulting from the softener treatment.

| Cotton sample | Wrinkle recovery value | Stoll flex abrasion cycles | |
|---|---|---|---|
| | | Warp | Filling |
| Unfinished control | 194 | 639 | 647 |
| Treated | 284 | 249 | 328 |
| Unfinished control with polyethylene softener | 194 | 726 | 465 |
| Treated with polyethylene softener | 291 | 518 | 627 |

EXAMPLE 50

A 100% cotton fabric is padded (60% wet-pick-up) at 120° F. in a bath containing 135 g. of a 50% solids solution of the resin prepared in Example 13, 24 g. of a 10% zinc nitrate solution, 0.6 g. of a non-ionic wetting agent and 141 g. water. The treated fabric is dried at 220° F. and cured at 330° F. for 90 seconds. The finished fabric is tested for wrinkle recovery, tensile strength and abrasion resistance. The results of those tests are:

| Cotton fabric | Wrinkle recovery value, degree | Ravel strip (pounds) | | Stoll flex (cycles) | |
|---|---|---|---|---|---|
| | | Warp | Filling | Warp | Filling |
| Unfinished control | 197 | 50 | 41 | 2,616 | 2,012 |
| Resin-finished | 283 | 42 | 22 | 817 | 1,021 |

EXAMPLES 51 THROUGH 53

According to the general procedure described in Example 47, samples of 100% cotton fabric are finished with (1) the N-methylol composition obtained by the procedure of Example 21, (2) the N-methylol composition of Example 22, and (3) the N-methylol composition obtained in Example 23. The fabrics finished with each of those resins are evaluated for wrinkle recovery, tensile strength and abrasion resistance. The test results are described in Table III.

EXAMPLE 54

According to the procedure described in Example 30, the solution of compounds prepared in Example 24 is applied to a cotton fabric. The finished fabric has a wrinkle recovery value of 305° (W and F), while the unfinished cotton control has a value of 185° (W and F).

EXAMPLE 55

According to the procedure described in Example 29, the solution of poly-N-methylol hexahydro-4-ethyl-5-methyl[4,5-d]pyrimidine-2,7-(1H,3H)dione and poly-N-methylol co-products prepared in Example 26 is applied to a cotton fabric. The finished fabric has a wrinkle recovery value of 284° (W and F) while the unfinished cotton control has a value of 185° (W and F).

EXAMPLE 56

According to the procedure described in Example 30, the poly-N-methylol hexahydro-4-ethyl-5-methylpyrimido [4,5-d]pyrimidine - 2,7 - (1H,3H)dione and co-products prepared according to Example 26 is applied to cotton fabric. The finished fabric has a wrinkle recovery value of 287° (W and F), while the unfinished cotton control has a value of 185° (W and F).

EXAMPLE 57

Three pad baths are prepared using the following ingredients:

Bath 1

150 g. of a 50% aqueous solution of dihydroxydimethylolethylene urea;
150 g. of a 50% solution of the products of Example 21;
70 g. of a 10% zinc nitrate solution;
2 g. of a non-ionic wetting agent; and sufficient water to bring the volume of the bath to 1000 ml.

Bath 2

150 g. of a 50% aqueous solution of dihydroxydimethylolethylene urea;
100 g. of a 50% solution of the solid products of Example 21;
50 g. of a 10% zinc nitrate solution;
2 g. of a non-ionic wetting agent; and sufficient water to bring the volume of the bath to 1000 ml.

Bath 3

250 g. of a 55% solution of dihydroxydimethylolethylene urea;
50 g. of a 10% zinc nitrate solution;
2 g. of a non-ionic wetting agent; and sufficient water to bring the volume of the bath to 1000 ml.

Cotton fabrics are padded in one of the baths and dried and cured according to the procedure described in Example 27. The treated fabrics and a control fabric then are tested for wrinkle recovery, tensile strength and abrasion resistance. The values obtained are:

| Cotton fabric | Degrees wrinkle recovery (W and F total) | Ravel strip (pounds) | | Stroll flex abrasion (cycles) | |
|---|---|---|---|---|---|
| | | Warp | Filling | Warp | Filling |
| Untreated control | 181 | 53 | 40 | 2,065 | 2,064 |
| Bath 1 | 289 | 37 | 24 | 823 | 632 |
| Bath 2 | 278 | 38 | 29 | 1,099 | 1,122 |
| Bath 3 | 284 | 30 | 21 | 369 | 428 |

TABLE III

| Example No. | Cotton fabric | Wrinkle recovery value, percent | Ravel strip (pounds) | | Stoll flex (cycles) | |
|---|---|---|---|---|---|---|
| | | | Warp | Filling | Warp | Filling |
| 51 | Unfinished control | 177 | 51.5 | 40.0 | 2,413 | |
| 51 | Resin finished | 266 | 38.0 | 26.2 | 395 | |
| 52 | Unfinished control | 140 | 50.0 | 38.9 | 1,949 | 1,950 |
| 52 | Resin finished | 268 | 34.4 | 23.2 | 413 | 365 |
| 53 | Unfinished control | 198 | 50.2 | 37.9 | 2,234 | |
| 53 | Resin finished | 244 | 37.8 | 23.8 | 283 | |

Fabrics treated with the novel resins are used to fabricate garments having desirable wrinkle resistant properties with improved tensile strength and abrasion resistance. The novel resin treated fabrics are also useful in areas other than wearing apparel, such as bed sheets, pillowcases, etc. The resins may also be used to stabilize fabrics (woven and knit goods), as a hand modified, for fabrics, and as a binder for pigments, flame retardants, etc.

The invention has been described in considerable detail with particular reference to certain preferred embodiments thereof, but it will be understood that variations and modifications may be effected within the spirit and scope of the invention as described hereinabove.

We claim:

1. A compound having the formula $$\begin{array}{c} CH_2OH \\ | \\ N \end{array} \quad \begin{array}{c} CH_2OH \\ | \\ N \end{array}$$

$$O= \diagdown \quad \diagdown =O$$

$$HOH_2O-N \diagdown \quad \diagup N-CH_2OH$$

$$R^1 \quad R^2 \quad R^1$$

wherein each $R^1$ is alkyl from 1 to 4 carbon atoms, and $R^2$ is hydrogen, methyl, ethyl or propyl.

References Cited

FOREIGN PATENTS 1,155,661  6/1969  Great Britain.

ALTON D. ROLLINS, Primary Examiner
R. V. RUSH, Assistant Examiner

U.S. Cl. X.R.

8—115.5, 127.6, 184, 185, 186; 260—256.4 C